United States Patent [19]

Tajima et al.

[11] Patent Number: 4,640,873

[45] Date of Patent: Feb. 3, 1987

[54] TEMPERATURE CONTROL SYSTEM FOR FUEL CELL POWERPLANT

[75] Inventors: Osamu Tajima, Hirakata; Makoto Yamada, Katano; Hideo Hagino, Otsu; Nobuyoshi Nishizawa, Neyagawa, all of Japan

[73] Assignee: Sanyo Electric Co., Ltd., Moriguchi, Japan

[21] Appl. No.: 840,794

[22] Filed: Mar. 18, 1986

[30] Foreign Application Priority Data

Mar. 19, 1985 [JP] Japan .................................. 60-55332

[51] Int. Cl.[4] .............................................. H01M 8/04

[52] U.S. Cl. .......................................... 429/24; 429/26

[58] Field of Search ......................... 429/24, 20, 26, 90

[56] References Cited

U.S. PATENT DOCUMENTS 3,595,699 7/1971 Baude .................................... 429/24
4,310,604 1/1982 Marchetti ......................... 429/24 X
4,393,123 7/1983 Lambrech ............................ 429/24

FOREIGN PATENT DOCUMENTS 0112262 7/1983 Japan ..................................... 429/24

*Primary Examiner*—Anthony Skapars
*Attorney, Agent, or Firm*—Armstrong, Nikaido, Marmelstein & Kubovcik

[57] ABSTRACT

A temperature control system for a fuel cell powerplant comprising two or more fuel cell stacks to which cooling gas and process gases are separately supplied, that comprises temperature detectors each being arranged in a fuel cell stack; stack dampers each being arranged in each of inlet or outlet branched pipelines of a circulating pipeline for cooling gas; means for calculating the average value of operating temperatures of all the cell stacks detected by said temperature detectors, a difference between the average value and each detected temperature of the cell stacks, and a difference between the average value and a predetermined value of the operating temperature of the fuel cell stacks; a driver for actuating each stack damper in response to the difference between the average value and the detected temperature of each cell stack, and means for controlling the flow rate and/or the temperature of the cooling gas fed to all the cell stacks in response to the difference between the average value and the predetermined value of the operating temperature.

3 Claims, 4 Drawing Figures

6
13
6a
6b
6c
6d
7a
7b
7c
7d
S1
S2
S3
S4
14
17
26
6a'
6b'
6c'
6d'
V1
V2
V3
V4
28
25a
25b
25c
25d
27
I/O PORT
23
24
22
21
20
RAM
CPU
ROM

START
X
1
Input T1
2
Input T2
3
Input T3
4
Input T4
5
Calculation
Tav = (T1 + T2 + T3 + T4) / 4
6
Tav=T1=T2=T3=T4
YES
NO
To Y
23
Tav=To
YES
NO
24
Tav To
NO
YES
25
lower flow rate of cooling gas and/or rise the temperature of cooling gas
26
Increase flow rate of cooling gas and/or lower the temperature of cooling gas
X

TEMPERATURE CONTROL SYSTEM FOR FUEL CELL POWERPLANT

BACKGROUND OF THE INVENTION

1. Field of the Invention

This invention relates to a temperature control system for a fuel cell powerplant of a separate cooling system. More particularly, the present invention relates to a temperature control system for a fuel cell powerplant of the kind wherein the powerplant comprises two or more fuel cell stacks and wherein cooling gas and process gases are separately fed to each fuel cell stack.

2. Description of the Prior Art

In a fuel cell system of the kind, fuel gas such as reformed hydrogen gas and an oxidant such as air are respectively fed to anode gas spaces and cathode gas spaces of each fuel cell stack and interact in the presence of catalyst to generate electric power. Since the fuel cell reaction is exothermic, it is required to cool the cell stack to maintain its operating temperature at the optimum value. For this reason, cooling gas such as, for example, air is supplied separate from the process air to cooling channels provided in each cell stack through respective circulating lines of the cooling gas. As a result of system design limitations such as geometric configurations, it has been considered to make common use of the cooling circulating line for all the cell stacks.

However, it has now been found that it is difficult to maintain the operating temperature of all the fuel cell stacks to the optimum value since an amount of the cooling gas supplied to each cell stack and an amount of heat generated by the fuel cell reaction vary from stack to stack.

It is therefore an object of the present invention to provide a temperature control system for a fuel cell powerplant of the kind that makes it possible to maintain the operating temperatures of all the fuel cell stacks to the optimum value.

Another object of the present invention is to provide a temperature control system for a fuel cell powerplant of the kind that makes it possible to make operating temperatures of all the fuel cell stacks uniform.

Still another object of the present invention is to provide an improved fuel cell powerplant with a long life and a high power output.

SUMMARY OF THE INVENTION

According to the present invention these and other objects are achieved by providing a temperature control system for a fuel cell powerplant of the kind wherein the powerplant comprises two or more fuel cell stacks and wherein cooling gas and process gases are separately fed to each fuel cell stack, that comprises temperature detectors each being arranged in a fuel cell stack:

stack dampers each being arranged in each of inlet or outlet branched pipelines of a circulating pipeline for cooling gas, said circulating pipeline including a blower and an heat exchanger;

means for calculating the average value of operating temperatures of all the cell stacks detected by said temperature detectors, a difference between the average value and each detected temperature of the cell stacks, and a difference between the average value and a predetermined value of the operating temperature of the fuel cell stacks;

a driver for actuating each stack damper in response to the difference between the average value and the detected temperature of each cell stack; and means for controlling the flow rate and/or the temperature of the cooling gas fed to all the cell stacks in response to the difference between the average value and the predetermined value of the operating temperature of the cell stacks.

The invention will be further apparent from the following description taken in conjunction with the accompanying drawings which show, by way of example only, a preferred embodiment thereof.

DETAILED DESCRIPTION OF THE PREFERRED EMBODIMENT

Figure 1:
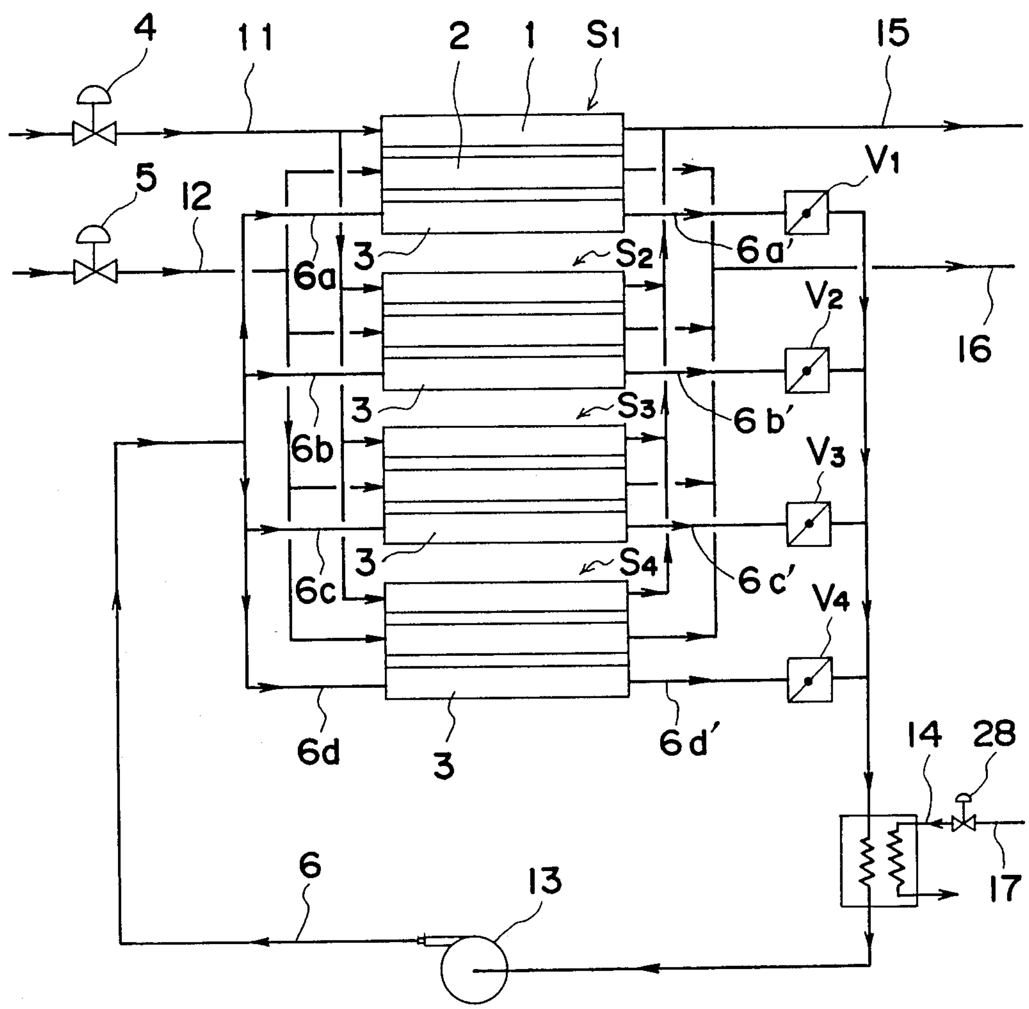
FIG. 1 is a schematic diagram showing an arrangement of a fuel cell powerplant according to the present invention.

Referring now to FIG. 1, there is shown a fuel cell powerplant comprising four fuel cell stacks $S_1$, $S_2$, $S_3$, $S_4$, each of which comprises a plurality of fuel cells, bipolar plates arranged between neighbouring two fuel cells, and cooling plates arranged every several fuel cells. The cell stacks $S_1$, $S_2$, $S_3$, $S_4$ are illustrated in FIG. 1 as being composed of a single fuel cell including an anode gas space 1, a cathode gas space 2, and a cooling gas channel 3 in order to simplify the drawing.

The anode gas spaces 1 of the cell stacks $S_1$, $S_2$, $S_3$, $S_4$ are respectively connected to a fuel gas feeding pipeline 11 provided with a flow control value 4, while the cathode gas spaces 2 are connected to an oxidant feeding pipeline 12 provided with a flow control valve 5. The cooling gas channels 3 are connected to a circulating pipeline 6 for cooling gas through branched inlet and outlet pipelines *6a, 6b, 6c, 6d, 6a', 6b', 6c', 6d'*. The circulating pipeline 6 is provided with a blower 13 and a heat exchanger 14. The branched outlet pipelines *6a'*, *6b'*, *6c'*, *6d'* are respectively provided with stack dampers $V_1$, $V_2$, $V_3$, $V_4$ to control an amount of the cooling gas flowing through each cell stack $S_1$, $S_2$, $S_3$, $S_4$.

Figure 2:
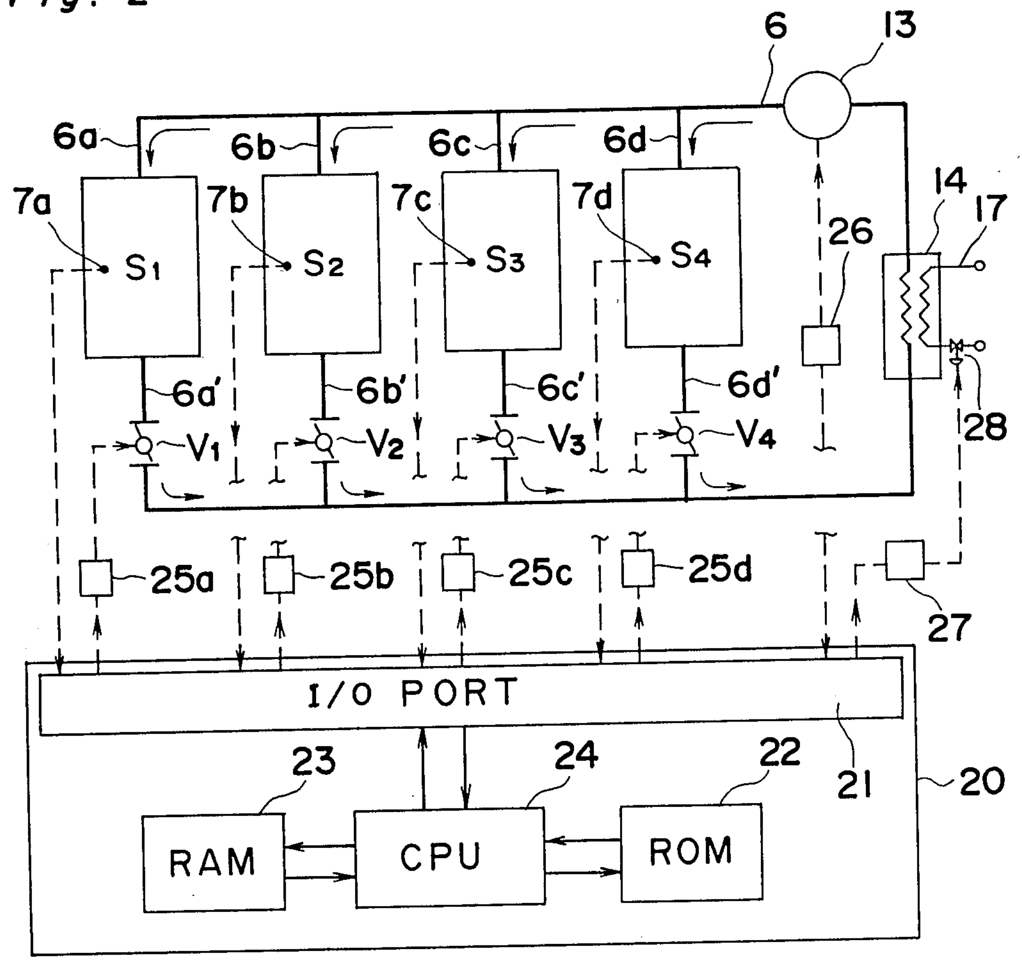
FIG. 2 is a block diagram of a temperature control system for a fuel cell powerplant according to the present invention.
Figure 3A:
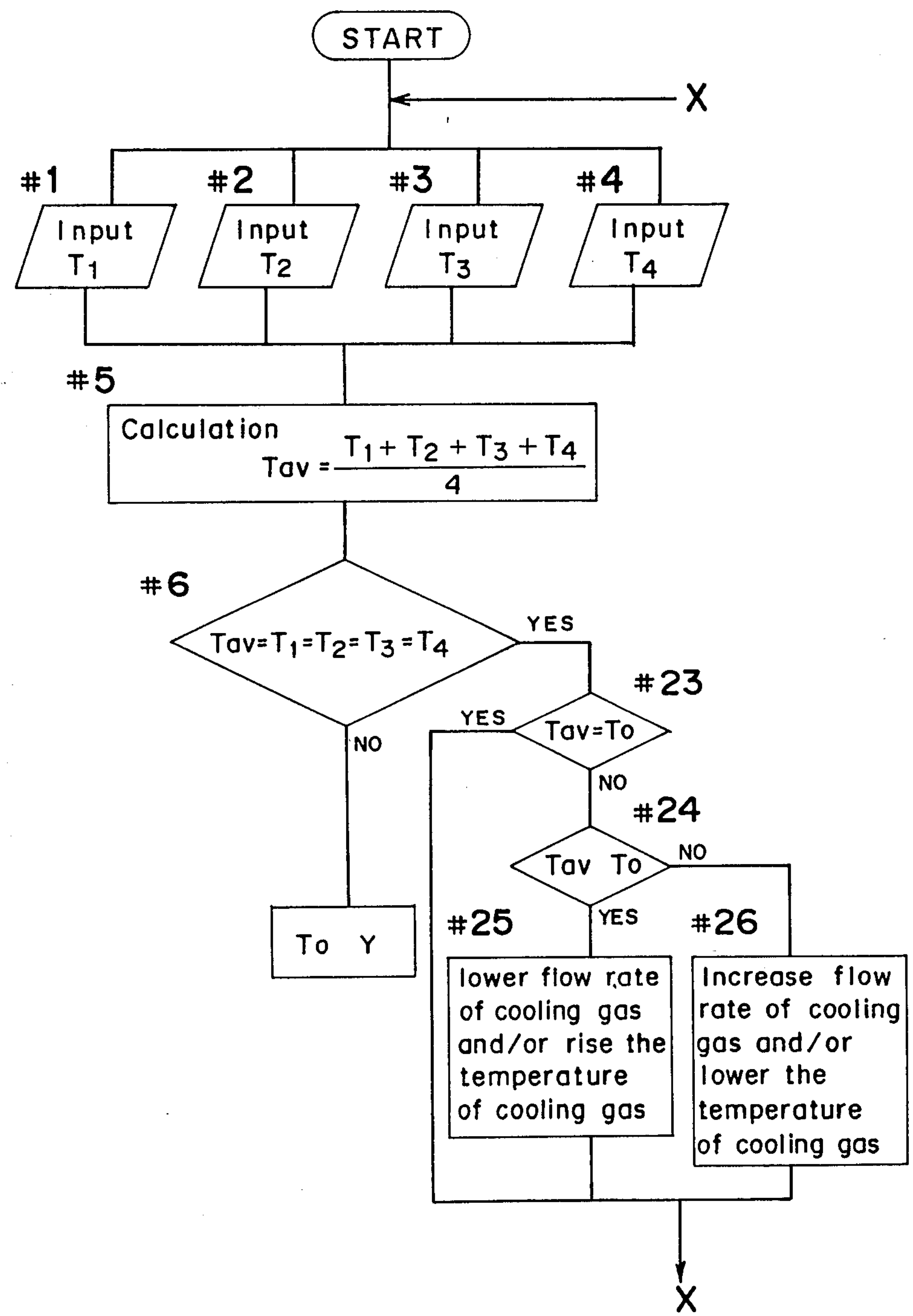
FIG. 3 is a flow chart showing the sequence of operation of the present invention.
Figure 3B:
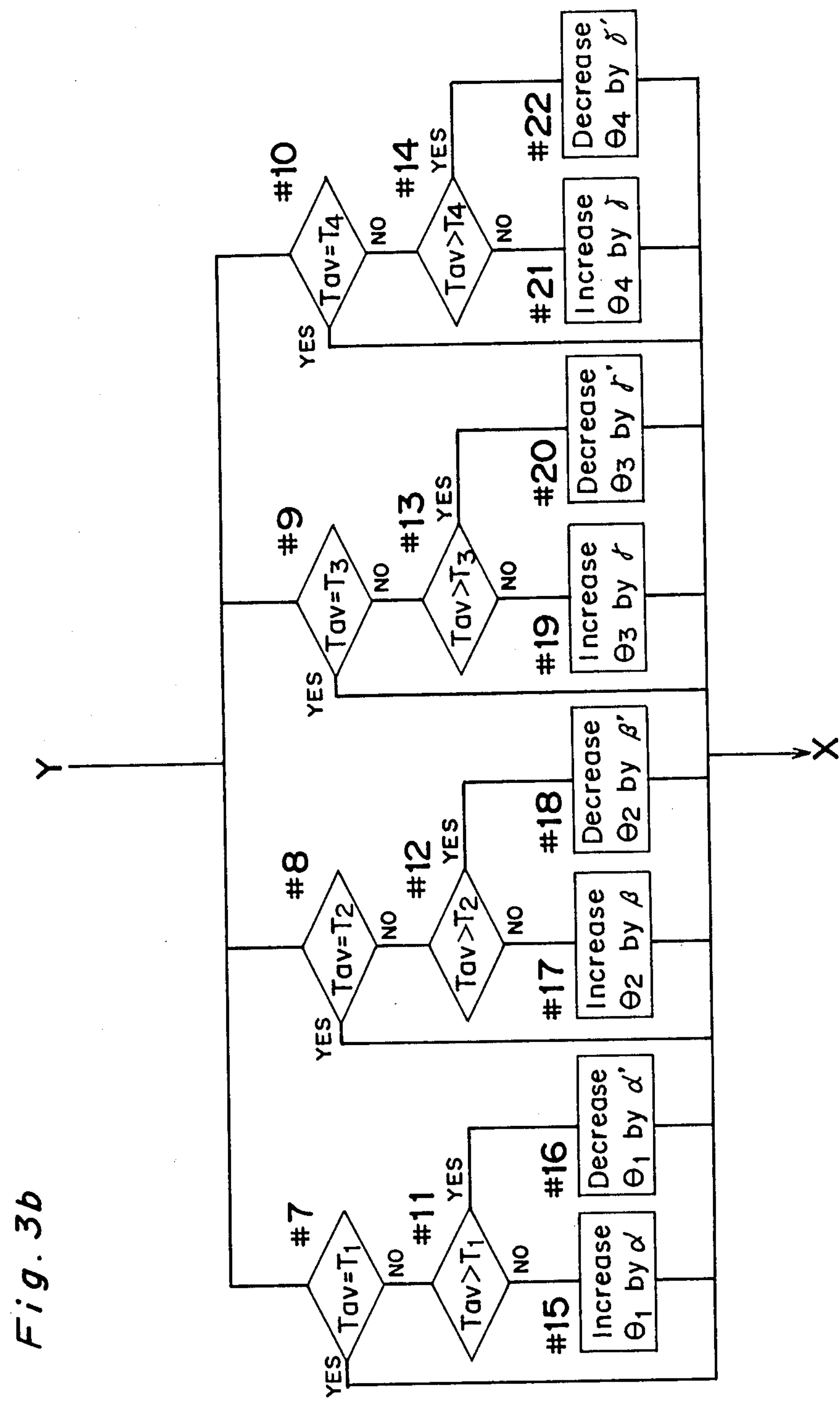

In order to control operating temperatures of the fuel cell stacks, the fuel cell powerplant of the present invention is provided with a temperature control system including temperature detectors *7a, 7b, 7c, 7d* arranged in the respective fuel cell stacks $S_1$, $S_2$, $S_3$, $S_4$, as shown in FIG. 2.

The temperature control system comprises a program controlled microprocessor 20 incorporating an input-/output port (I/O port) 21, a read-only memory (ROM) 22, a random-access memory (RAM) 23 and a central processing unit (CPU) 24. The control system further comprises drivers 25*a*, 25*b*, 25*c*, 25*d* for controlling the amount of opening of the stack dampers $V_1$, $V_2$, $V_3$, $V_4$ in response to the output signals of the microprocessor 20; drivers 26 for controlling the rotational speed of the blower 13 and driver 27 for controlling the amount of valve opening of a flow control valve 28 arranged in a pipeline 17 for cooling water. The microprocessor 20 and drivers 25, 26, 27 work in conjunction with each other to control the operating temperatures of the fuel cell stacks $S_1$, $S_2$, $S_3$, $S_4$. The output signals of the temperature detector 7a, 7b, 7c, 7d are applied to the I/O port 21 of the microprocessor 20. The stack dampers $V_1$, $V_2$, $V_3$, $V_4$, blower 13 and flow control valve 28 are connected to the I/O port 21 through the drivers 25, 26, 27.

The microprocessor 20 constitutes means for calculating the average value of operating temperatures of all the cell stacks detected by said temperature detectors, a difference between the average value and each detected temperature of the cell stacks, and a difference between the average value and a predetermined value of the operating temperature of the fuel cell stacks. The output signals of the microprocessor 20 are respectively applied to the drivers 25a, 25b, 25c, 25d, and 27.

In operation, the process gases such as, for example, reformed hydrogen gas and process air are respectively fed through the pipelines 11 and 12 to the anode gas spaces 1 and cathode gas spaces 2 of each fuel cell stack $S_1$, $S_2$, $S_3$, $S_4$ where they react to generate electric power. The remaining gases and product gas are exhausted from the cell stack through the respective pipelines 15 and 16.

Since the fuel cell reaction is exothermic, the heat generated must be released from the cell stacks to maintain its operating temperature to the optimum value. For this purpose, the cooling gas such as, for example, air is supplied by the blower 13 through the pipeline 6 and the branched inlet pipelines 6a, 6b, 6c and 6d to the cooling gas channels 3 of the cell stacks $S_1$, $S_2$, $S_3$, $S_4$ where the cooling gas absorbs the heat generated by the fuel cell reaction and flows out of the cell stacks through the branched outlet pipelines 6a', 6b', 6c', 6d'. The elevated cooling gas is cooled by the heat exchanger 14 and fed to the stacks by the blower 13.

In order to maintain the operating temperatures of the fuel cell stacks at the optimum value, the stack dampers $V_1$, $V_2$, $V_3$, $V_4$, the blower 13 and the heat exchanger 14 are controlled by the temperature control system in the following manner.

The operating temperatures ($T_1$), ($T_2$), ($T_3$), ($T_4$) of the cell stacks $S_1$, $S_2$, $S_3$, $S_4$ are detected at each instant by the temperature detectors 7a, 7b, 7c, 7d and applied to the I/O port 21 of the microprocessor 20 (steps 1-4) where the output signal of each temperature detector 7a, 7b, 7c, 7d are stored in RAM 23 and used to calculate the average value ($T_{av}$) of the detected temperatures. The average value (Tav) is computed (step 5), stored in RAM 23 and used to calculate a difference between the average value (Tav) and each operating temperature ($T_1$), ($T_2$), ($T_3$), ($T_4$) of the fuel cell stacks $S_1$, $S_2$, $S_3$, $S_4$.

In the step 6, the microprocessor 20 compares the average value (Tav) with each of the detected temperatures ($T_1$), ($T_2$), ($T_3$), ($T_4$) of the cell stacks $S_1$, $S_2$, $S_3$, $S_4$, and the output signals corresponding to the difference between the average value (Tav) and each of the detected temperature ($T_1$), ($T_2$), ($T_3$), ($T_4$) are stored in RAM 23. If the average value (Tav) is equal to all the detected temperatures ($T_1$), ($T_2$), ($T_3$), ($T_4$), the program flow shifts to the step 23. If the average value (Tav) is not equal to the detected values, it is in turn compared with each detected value ($T_1$), ($T_2$), ($T_3$), ($T_4$) in the steps 7 to 10, and the flow rate of the cooling gas passing through each cell stack $S_1$, $S_2$, $S_3$, $S_4$ is controlled by adjusting the amount of valve opening ($\theta_1$, $\theta_2$, $\theta_3$, $\theta_4$) of the stack dampers $V_1$, $V_2$, $V_3$, $V_4$ in the steps 11 to 22.

For example, if the detected value ($T_1$) is judged, in the step 7, as being equal to the average value (Tav), the program flow returns to the step 1. In the case where the average value (Tav) is judged, in the step 7, as being not equal to the detected value ($T_1$), the program flow proceeds to the step 11. In this step, if the average value (Tav) is judged as being higher than the detected value ($T_1$), the program flow proceeds to step 16 where the microprocessor 20 gives the output signal corresponding to the difference between (Tav) and ($T_1$) to the driver 25a. The driver 25a actuates the stack damper $V_1$ to decrease the amount of valve opening ($\theta_1$) by an angle $\alpha'$ in proportion to the difference between (Tav) and ($T_1$), resulting in decrease in the flow rate of the cooling gas flowing through the cooling gas channels 3 of the cell stack $S_1$.

If the average value (Tav) is judged, in the step 11, as being not higher than the detected value ($T_1$) of the cell stack $S_1$, the program flow proceeds to the step 15 where the amount of valve opening ($\theta_1$) of the the stack damper $V_1$ is increased by an angle $\alpha$ in proportion to the difference between (Tav) and ($T_1$) to increase the flow rate of the cooling gas flowing through the cooling gas channels 3 of the cell stack $S_1$.

Similar operations are carried out for each of the other cell stacks $S_2$, $S_3$, $S_4$.

In the step 23, the average value (Tav) is compared with the predetermined optimum value ($T_0$) of the operating temperature stored in ROM 22 to determine the difference between them. If the average value (Tav) is equal to the predetermined, the program flow returns to the step 1. If the average value (Tav) is judged as being not equal to the predetermined value ($T_0$), the program flow proceeds to the step 24 where the average value (Tav) is compared with the predetermined value ($T_0$) to determine a difference between them. If (Tav) is judged, in the step 24, as being lower than ($T_0$), the program flow proceeds to the step 25 and the microprocessor 20 gives an output signal corresponding to the difference between them to the driver 26 to lower the rotational speed of the blower 13, resulting in decrease in the flow rate of the cooling gas flowing through the cooling gas circulating pipeline 6. At the same time, the output signal of the microprocessor 20 is also applied to the driver 27 to decrease the amount of valve opening of the flow control valve 28 so that amount of cooling water fed to the heat exchanger 14 through the pipeline 17 is decreased, resulting in rise of the temperature of the cooling gas fed to the cooling gas channels 3 of the cell stack $S_1$.

On the other hand, if the average value (Tav) is judged as being not lower than the predetermined value ($T_0$), the program flow proceeds to the step 26 where the rotational speed of the blower 13 is decreased by the driver 26 and the amount of valve opening of the flow control valve 28 is increased by the driver 27. For these reasons, the flow rate of the cooling gas flowing through the circulating line 6 is increased, and the amount of cooling water fed to the heat exchanger 14 through the pipeline 17 is increased to lower the temperature of the cooling gas fed to the cooling gas channels 3 of the cell stacks $S_1$, $S_2$, $S_3$, $S_4$.

In the above embodiment, the output signals of the microprocessor 20 corresponding to the difference between (Tav) and ($T_0$) are applied to both the drivers 26 and 27, but the output signals may be applied to either the driver 26 or the driver 27 to control either the flow rate or temperature of the cooling gas fed the the fuel cell stacks $S_1$, $S_2$, $S_3$, $S_4$.

In the case where the load varies gradually, it is preferred to control the amount of cooling water fed to the heat exchanger in proportion to the difference between (Tav) and ($T_0$). However, if there is a considerable fluctuations in the load, it is preferred to control the rotational speed of the blower.

According to the present invention, the temperature of each cell stack is automatically controlled within the deviation of ±1° C. in proportion to the deviation from the predetermined operating temperature, thus making it possible to improve the life of the fuel cell powerplant.

What I claim is:

1. A temperature control system for a fuel cell powerplant of the kind wherein the powerplant comprises two or more fuel cell stacks and wherein cooling gas and process gases are separately fed to each fuel cell stack, that comprises temperature detectors each being arranged in a fuel cell stack;

stack dampers each being arranged in each of inlet or outlet branched pipelines of a circulating pipeline for cooling gas, said circulating pipeline including a blower and an heat exchanger:

means for calculating the average value of operating temperatures of all the cell stacks detected by said temperature detectors, a difference between the average value and each detected temperature of the cell stacks, and a difference between the average value and a predetermined value of the operating temperature of the fuel cell stacks;

a driver for actuating each stack damper in response to the difference between the average value and the detected temperature of each cell stack, means for controlling the flow rate and/or the temperature of the cooling gas fed to the cell stacks in response to the difference between the average value and the predetermined value of the operating temperature of the cell stacks.

2. The temperature control system according to claim 1 wherein means for controlling the flow rate of the cooling gas fed to the cell stacks comprises a driver for controlling the rotational speed of the blower, 3. The temperature control system according to qlaim 1 wherein means for controlling the temperature of the cooling gas fed to the cell stacks comprises a flow control valve arranged in a pipeline for cooling water at the inlet of the heat exchanger, and a driver for controlling the amount of valve opening of the flow control valve.

* * * * *